(12) United States Patent
Fujita et al.

(10) Patent No.: US 12,524,093 B2
(45) Date of Patent: Jan. 13, 2026

(54) DISPLAY DEVICE

(71) Applicant: Sharp Display Technology Corporation, Kameyama (JP)

(72) Inventors: Tetsuo Fujita, Kameyama (JP); Tetsunori Tanaka, Kameyama (JP); Yukinobu Nakata, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/687,302

(22) PCT Filed: Nov. 22, 2021

(86) PCT No.: PCT/JP2021/042777
§ 371 (c)(1),
(2) Date: Feb. 28, 2024

(87) PCT Pub. No.: WO2023/089821
PCT Pub. Date: May 25, 2023

(65) Prior Publication Data
US 2024/0385708 A1 Nov. 21, 2024

(51) Int. Cl.
*G06F 3/041* (2006.01)
*G06F 3/044* (2006.01)
(Continued)

(52) U.S. Cl.
CPC ........ *G06F 3/0412* (2013.01); *G06F 3/04164* (2019.05); *G06F 3/0445* (2019.05);
(Continued)

(58) Field of Classification Search
CPC .... G06F 3/0412; G06F 3/0445; G06F 3/0446; G06F 3/04164; H10K 59/131;
(Continued)

(56) References Cited

U.S. PATENT DOCUMENTS 11,556,194 B2 * 1/2023 Matsumoto ............ H05B 33/06
11,934,600 B2 * 3/2024 Miyamoto ............ G06F 3/0448
(Continued)

FOREIGN PATENT DOCUMENTS

| JP | 2018-036761 A | | 3/2018 | | |
| JP | 2024032939 A | * | 3/2024 | ........... | G06F 3/0412 |
| TW | 202423271 A | * | 6/2024 | ......... | H01L 27/3216 |

*Primary Examiner* — Ricardo Osorio
(74) *Attorney, Agent, or Firm* — ScienBiziP, P.C.

(57) ABSTRACT

A display device includes: a substrate; an interlayer insulating layer configured to cover a plurality of wiring lines on the substrate; a light-emitting element on the interlayer insulating layer; a sealing layer configured to cover the light-emitting element; a first inorganic insulating layer configured to cover the sealing layer; a first detection electrode extending in a first direction on the first inorganic insulating layer; a second inorganic insulating layer configured to cover the first detection electrode and the first inorganic insulating layer; a second detection electrode extending in a direction intersecting the first direction on the second inorganic insulating layer; and a third inorganic insulating layer configured to cover the second detection electrode and the second inorganic insulating layer, wherein the first inorganic insulating layer, the second inorganic insulating layer, and the third inorganic insulating layer are provided with an opening in a region corresponding to a light-emitting region.

6 Claims, 9 Drawing Sheets

(51) Int. Cl.
  *H10K 59/131*   (2023.01)
  *H10K 59/40*    (2023.01)
  *H10K 59/80*    (2023.01)
  *H10K 102/00*       (2023.01)

(52) U.S. Cl.
  CPC ......... *G06F 3/0446* (2019.05); *H10K 59/131* (2023.02); *H10K 59/40* (2023.02); *H10K 59/873* (2023.02); *H10K 2102/311* (2023.02)

(58) Field of Classification Search
  CPC ................. H10K 59/40; H10K 59/873; H10K 2102/311; H10K 59/00; H10K 50/00; H05B 33/02; H05B 33/04; H05B 33/14
  See application file for complete search history.

(56) References Cited

U.S. PATENT DOCUMENTS

| | | | |
|---|---|---|---|
| 2016/0103516 A1* | 4/2016 | An | G06F 3/0412 |
| | | | 345/174 |
| 2017/0256593 A1 | 9/2017 | Jung et al. | |
| 2018/0061900 A1* | 3/2018 | Hiraga | H10K 50/841 |
| 2019/0115396 A1 | 4/2019 | Hiraga et al. | |
| 2023/0359151 A1* | 11/2023 | Yoshizumi | G04B 47/00 |
| 2025/0063913 A1* | 2/2025 | Managaki | H10K 50/844 |
| 2025/0181198 A1* | 6/2025 | Kong | H10K 59/8791 |

* cited by examiner

DISPLAY DEVICE

TECHNICAL FIELD

The disclosure relates to a display device, and in particular, relates to a built-in touch panel display device in which a touch panel is integrated.

BACKGROUND ART

In recent years, in the field of mobile devices such as smartphones, a display device (built-in touch panel display device) including a touch panel in which a finger, a stylus, or the like as an input mechanism is brought into contact with a display surface and a function is selected in response to a contact position is put into practice. Built-in touch panel display devices include a display device disclosed in PTL 1, for example.

CITATION LIST

Patent Literature

PTL 1: JP 2018-36761

SUMMARY

Technical Problem

The built-in touch panel display devices include a so-called out-cell type in which a built-in touch panel is attached onto a display panel, and an on-cell type in which a built-in touch panel is directly manufactured on a display substrate constituting the display panel. In recent years, on-cell type built-in touch panel display devices have become mainstream.

However, in the on-cell type built-in touch panel display device, a wiring line pattern of the touch panel is formed in the uppermost layer of the display panel, and thus the wiring line pattern is protected by being covered with an organic film. As described above, since the uppermost layer of the display panel is covered with the organic film, it may cause a decrease in transmittance in a transmissive region of the display panel. Moreover, since the organic film has low water resistance, atmospheric components (moisture and the like) may enter a formation region of the wiring line pattern from the organic film, wiring line corrosion is caused, which leads to a decrease in reliability of a built-in touch panel wiring line.

The disclosure has been made in view of the above problems, and an object thereof is to provide a display device that prevents a decrease in transmittance in a transmissive region of a display panel and improves reliability of a built-in touch panel wiring line.

Solution to Problem

A display device according to one aspect of the disclosure includes: a substrate on which a plurality of wiring lines are formed; an interlayer insulating layer configured to cover the plurality of wiring lines on the substrate; a light-emitting element on the interlayer insulating layer; a sealing layer configured to cover the light-emitting element; a first inorganic insulating layer configured to cover the sealing layer; a first detection electrode extending in a first direction on the first inorganic insulating layer; a second inorganic insulating layer configured to cover the first detection electrode and the first inorganic insulating layer; a second detection electrode extending in a direction intersecting the first direction on the second inorganic insulating layer; and a third inorganic insulating layer configured to cover the second detection electrode and the second inorganic insulating layer, in which the first inorganic insulating layer, the second inorganic insulating layer, and the third inorganic insulating layer are provided with an opening in a region corresponding to a light-emitting region where the light-emitting element emits light.

Advantageous Effects of Disclosure

According to the disclosure, it is possible to prevent a decrease in transmittance in a transmissive region of a display panel and improve reliability of a touch panel wiring line.

DESCRIPTION OF EMBODIMENTS

Hereinafter, embodiments of the disclosure will be described in detail with reference to the drawings. However, the materials, shapes, relative arrangements thereof, and the like of the components described in this embodiment are merely one embodiment, and the scope of the disclosure should not be interpreted to be limited by these.

First Embodiment

One embodiment of the disclosure will be described below.

Overview of Display Device 100

Figure 1:
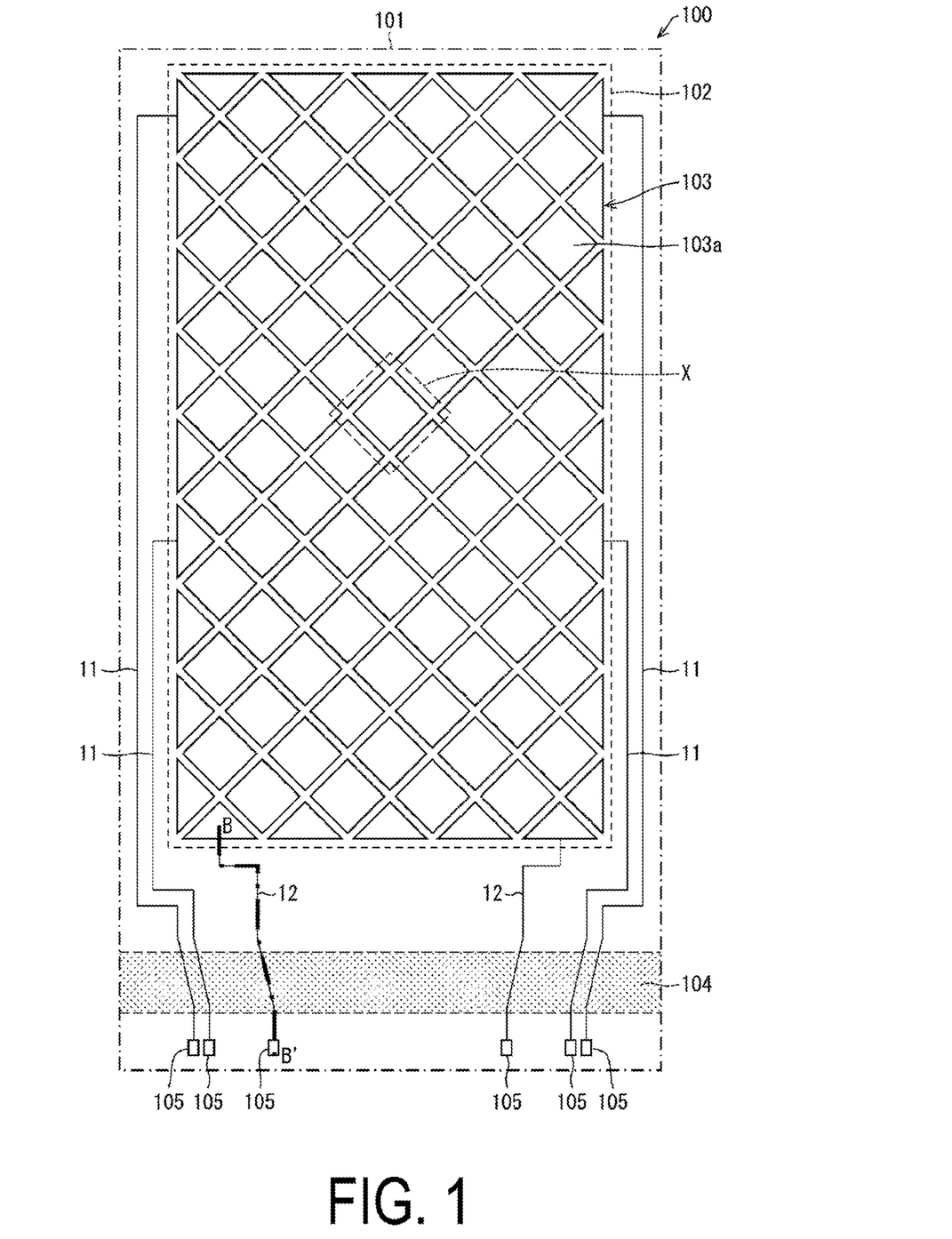
FIG. 1 is a plan view illustrating a schematic configuration of a display device according to one embodiment of the disclosure.

FIG. 1 is a plan view illustrating a schematic configuration of a built-in touch panel display device 100. As illustrated in FIG. 1, the display device 100 includes a display panel 101, and a touch panel 103 in which a plurality of touch regions 103*a* are arranged in a matrix is integrally formed on a sealing layer region 102 of the display panel 101. The sealing layer region 102 is a region where a sealing layer 139 (FIG. 3) formed on a display region (not illustrated) of the display panel 101 is formed. In practice, the touch panel 103 is formed on the sealing layer 139. Therefore, the display device 100 is an on-cell type built-in touch panel display device.

In the present embodiment, the display panel 101 will be described on an assumption of a flexibly supportable organic light-emitting diode (OLED) display. The display panel 101 is not limited to the OLED display, and may be a quantum dot light-emitting diode (QLED) display.

Figure 3:
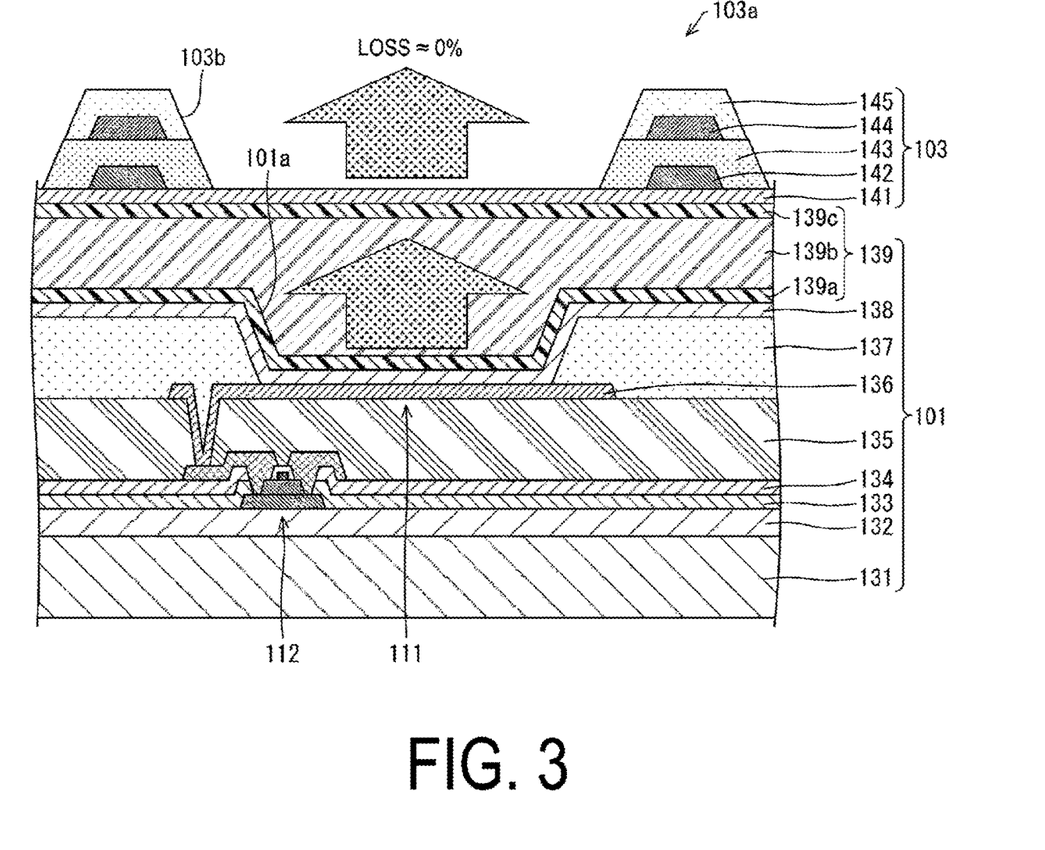
FIG. 3 is a cross-sectional view taken along line AA' of FIG. 2.

In the display panel 101, a plurality of terminal electrodes 105 are formed along an end portion on an opposite side to a side where the touch panel 103 is formed. The terminal electrode 105 is a terminal electrode for the built-in touch panel 103, and is a terminal electrode for connecting to an electrode provided on a device side when the display panel 101 is mounted on the device (for example, a mobile terminal such as a smartphone). The plurality of terminal electrodes 105 include the terminal electrode 105 connected to a first connection wiring line 11 to be electrically connected to a first metal electrode 142 (FIG. 3) of the touch panel 103 and the terminal electrode 105 connected to a second connection wiring line 12 to be electrically connected to a second metal electrode 144 (FIG. 3). Due to this, the length from the first metal electrode 142 to the terminal electrode 105 can be adjusted by the length of the first connection wiring line 11. Similarly, the length from the second metal electrode 144 to the terminal electrode 105 can be adjusted by the length of the second connection wiring line.

A bent region 104 formed on the terminal electrode 105 side of the display panel 101 is a region that is bent when the display panel 101 is mounted on a device. Therefore, a formation position and a size of the bent region 104 are determined by a size and a shape of a device body on which the display panel 101 is mounted.

Details of Display Device 100

Figure 2:
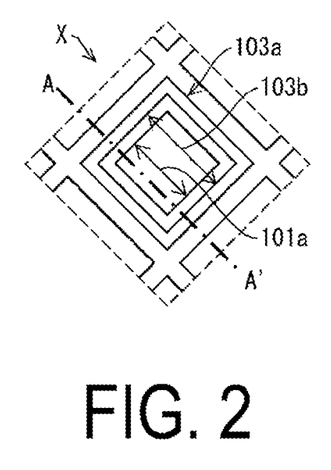
FIG. 2 is an enlarged view of a configuration of the main portions of the display device illustrated in FIG. 1.
Figure 4:
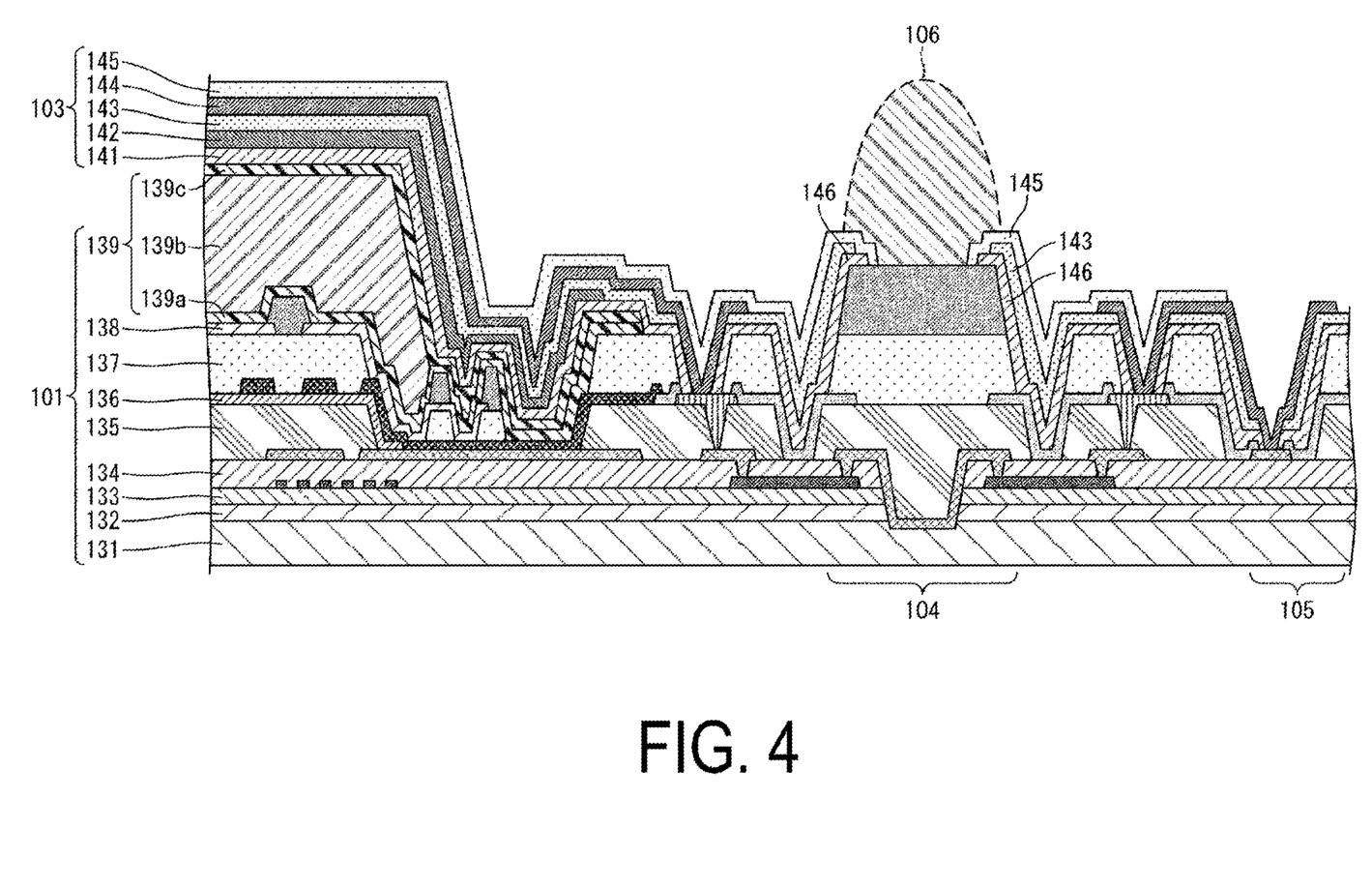
FIG. 4 is a cross-sectional view taken along line BB' of FIG. 1.

FIG. 2 is an enlarged view of an X region illustrated in FIG. 1, and FIG. 3 is a cross-sectional view taken along line AA' of FIG. 2. FIG. 4 is a cross-sectional view taken along line BB' illustrated in FIG. 1.

As illustrated in FIG. 2, an opening 103b larger than a light-emitting region 101a of the display panel 101 in plan view is formed in the touch region 103a of the touch panel 103. Due to this, the light emitted from the light-emitting region 101a of the display panel 101 can be transmitted through the touch panel 103 with almost no loss. Hereinafter, the structures of the display panel 101 and the touch panel 103 will be described in detail.

In the display panel 101, as illustrated in FIG. 3, a barrier layer 132 made of an inorganic insulating film is formed on a flexible insulating substrate (substrate: flexible substrate) 131, and a TFT layer is formed in an upper layer overlying the barrier layer 132. The TFT layer includes a semiconductor layer 133, an inorganic insulating film 134 formed in an upper layer overlying the semiconductor layer 133, an interlayer insulating film (interlayer insulating layer) 135 formed in an upper layer overlying the inorganic insulating film 134, and a light-emitting element layer (light-emitting element) 111 formed in an upper layer overlying the interlayer insulating film 135. The light-emitting element layer 111 includes an anode 136 formed in the upper layer overlying the interlayer insulating film 135, an insulating edge cover 137 covering the anode 136, and an OLED layer 138 including a cathode on an upper layer than the edge cover 137. A transistor 112 for driving the OLED layer 138 is formed on the barrier layer 132.

A sealing layer (thin film encapsulation (TFE)) 139 is formed in an upper layer overlying the OLED layer 138 so as to cover the OLED layer 138. The sealing layer 139 includes an inorganic sealing film 139a being transparent and directly covering the OLED layer 138, an organic buffer film 139b on an upper layer than the inorganic sealing film 139a, and an inorganic sealing film 139c on an upper layer than the organic buffer film 139b. The sealing layer 139 prevents infiltration of foreign substances such as water and oxygen into the light-emitting element layer 111.

The touch panel 103 is formed in an upper layer overlying the sealing layer 139 of the display panel 101. As illustrated in FIG. 3, the touch panel 103 includes a base coat layer (first inorganic insulating layer) 141 made of an inorganic film (SiNx) formed in an upper layer overlying the inorganic sealing film 139c constituting the uppermost layer of the sealing layer 139, a first metal electrode (first detection electrode) 142 formed in an upper layer overlying the base coat layer 141, a topcoat layer (second inorganic insulating layer) 143 made of an inorganic film (SiNx) formed so as to cover the base coat layer 141 and the first metal electrode 142, a second metal electrode (second detection electrode) 144 formed in an upper layer overlying the topcoat layer 143, and an overcoat layer (third inorganic insulating layer) 145 made of an inorganic film (SiNx) formed so as to cover the topcoat layer 143 and the second metal electrode 144. The first metal electrode 142 and the second metal electrode 144 constitute the touch panel wiring line of the touch panel 103. That is, the first metal electrode 142 is formed so as to extend in the first direction on the base coat layer 141, which is the first inorganic insulating layer, and the second metal electrode 144 is formed so as to extend in a direction intersecting the first direction on the topcoat layer 143, which is the second inorganic insulating layer. The electrodes constituting the touch panel wiring line of the touch panel 103 include a third metal electrode 146 (FIG. 4) in addition to the first metal electrode 142 and the second metal electrode 144. Here, the third metal electrode 146 is formed of the same electrode material as the first metal electrode 142. The electrode material of the third metal electrode 146 may be the same electrode material as the second metal electrode 144.

In the touch panel 103, the opening 103b is formed in a region corresponding to the light-emitting region 101a where the OLED layer 138 of the display panel 101 emits light. That is, the opening 103b is formed by opening a region corresponding to the light-emitting region 101a where the OLED layer 138 of the display panel 101 emits light in the base coat layer 141, the topcoat layer 143, and the overcoat layer 145 of the touch panel 103. It is preferable that the opening 103b of the touch panel 103 overlaps the light-emitting region 101a in plan view, and is formed larger than the light-emitting region 101a.

As illustrated in FIG. 4, the overcoat layer 145 constituting the touch panel 103 is formed so as to extend to the position right in front of the bent region 104 and completely cover the metal layer (the second metal electrode 144 and the third metal electrode 146) in the uppermost layer. Furthermore, the overcoat layer 145 is formed so as to extend from the bent region 104 to the position right in front of the terminal electrode 105. That is, the overcoat layer 145, which is the third inorganic insulating layer, includes the bent region 104 (excluding a part where a sealing resin 106 is formed) that is a bendable portion of the insulating substrate 131, and is formed at the position right in front of the terminal electrode 105 of the insulating substrate 131. Therefore, each of the metal electrodes (the first metal electrode 142, the second metal electrode 144, and the third metal electrode 146) constituting the touch panel 103 is protected by the overcoat layer 145, which is an inorganic film (SiNx) having higher water resistance than an organic film.

Manufacturing Method for Display Device 100

Figure 5:
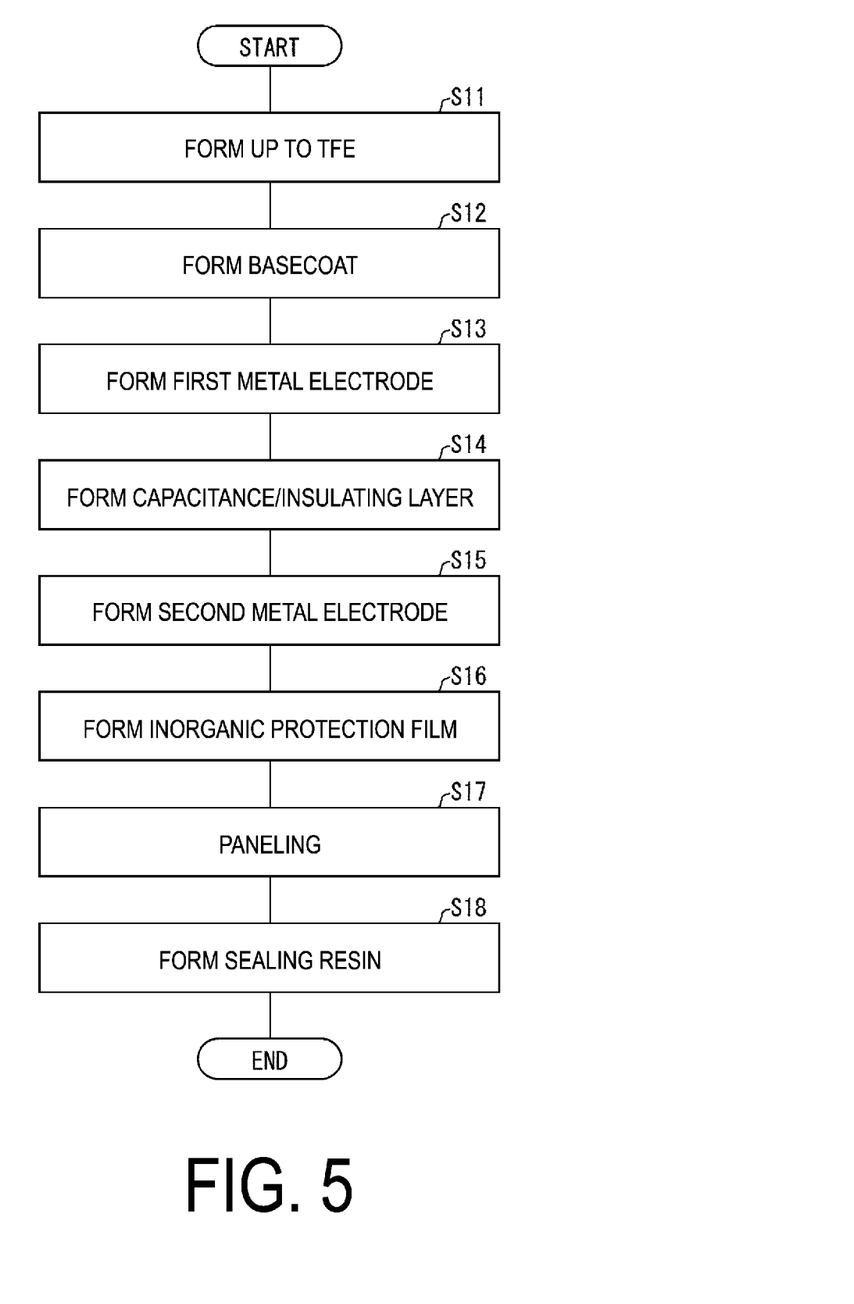
FIG. 5 is a view illustrating a manufacturing process of the display device illustrated in FIG. 1.

FIG. 5 is a view illustrating each process of a manufacturing method for the display device 100. First, the process is performed up to formation of the sealing layer (TFE) 139 on the OLED layer 138 of the display panel 101 (step S11). Since the manufacturing process in step S1 is the same as the manufacturing process of a general OLED panel, details will be omitted.

Next, the base coat is formed (step S12). Here, the base coat layer 141 made of an inorganic film (SiNx) as a base coat is formed on the sealing layer 139 by a CVD method, for example.

Subsequently, the first metal electrode is formed (step S13). Here, a single layer film or a layered film of a metal including at least one of, for example, aluminum, tungsten, molybdenum, tantalum, chromium, titanium, or copper is formed on the base coat layer 141, and formed in a desired pattern by etching to provide the first metal electrode 142.

Next, a capacitance/insulating layer is formed (step S14). Here, the capacitance/insulating layer is formed on the first metal electrode 142 formed in a desired pattern. The capacitance/insulating layer is made of an inorganic film (SiNx), and becomes the topcoat layer 143 covering the first metal electrode 142. Here, in a case where the first metal electrode 142 and the second metal electrode 144 are electrically connected, a contact hole is formed in step S14. In step S14, a part of the opening 103b of the topcoat layer 143 may be processed.

Next, the second metal electrode is formed (step S15). Here, a single layer film or a layered film of a metal including at least one of a metal similar to that of the first metal electrode 142, for example, aluminum, tungsten, molybdenum, tantalum, chromium, titanium, or copper is formed on the topcoat layer 143, and formed in a desired pattern by etching to provide the second metal electrode 144.

Subsequently, an inorganic protection film is formed (step S16). Here, the inorganic protection film is formed so as to cover the second metal electrode 144. The inorganic protection film is made of an inorganic film (SiNx), is formed on the topcoat layer 143 by a CVD method, for example, and becomes the overcoat layer 145. Here, in the case where a part of the opening 103b of the topcoat layer 143 is processed in step S14, the opening 103b of the overcoat layer 145 is processed in this step S16. In the case where a part of the opening 103b of the topcoat layer 143 is not processed in step S14, the processing of the openings 103b of the topcoat layer 143 and the overcoat layer 145 are collectively performed in step S16.

Thereafter, paneling is performed (step S17). Here, in the manufacturing process so far, the flexible insulating substrate (substrate: flexible substrate) 131 processed on a carrier glass is peeled off from the carrier glass by laser lift-off, thereby performing paneling. At this time, in a case where a plurality of panels such as a small panel for a smartphone is manufactured on the carrier glass, the panels are individually divided.

Finally, the sealing resin 106 is formed (step S18). Here, the sealing resin 106 is formed on the outermost surface of the bent region 104.

Advantageous Effects

Figure 6:
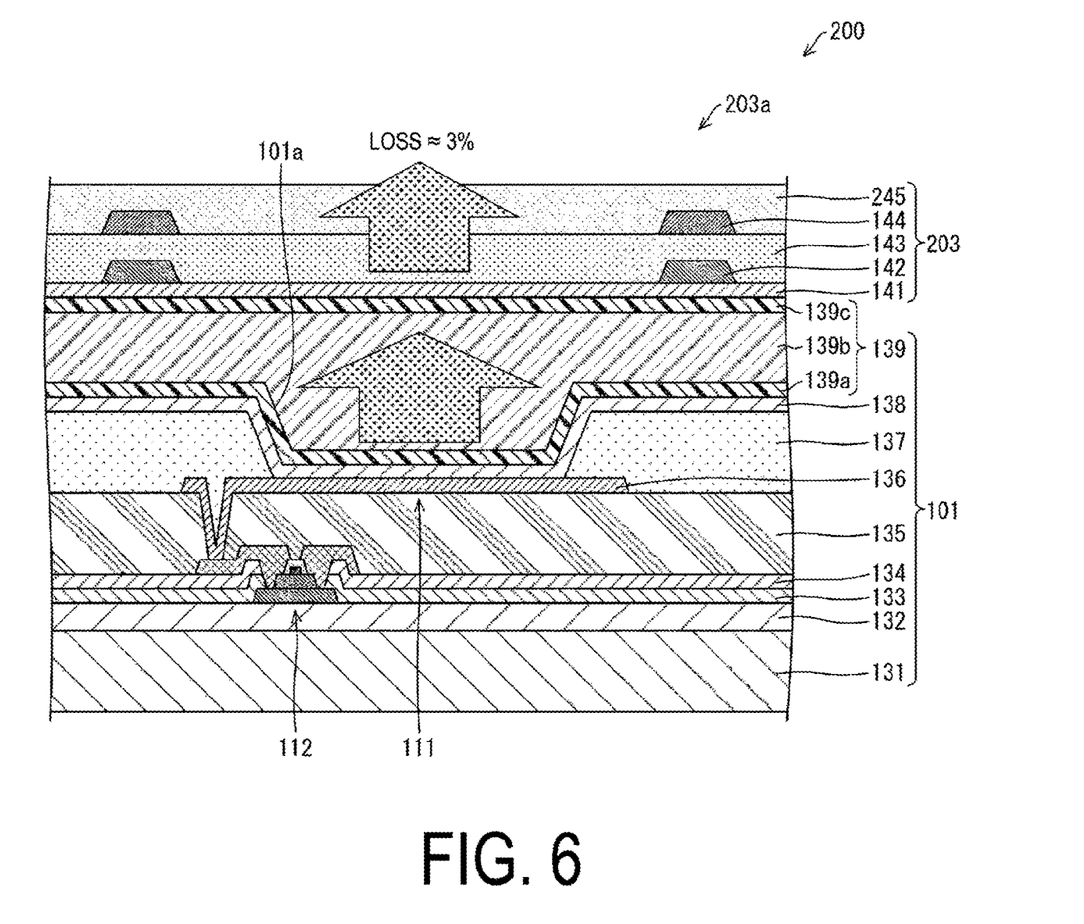
FIG. 6 is a cross-sectional view illustrating a comparative example corresponding to the cross-sectional view of FIG. 3.
Figure 7:
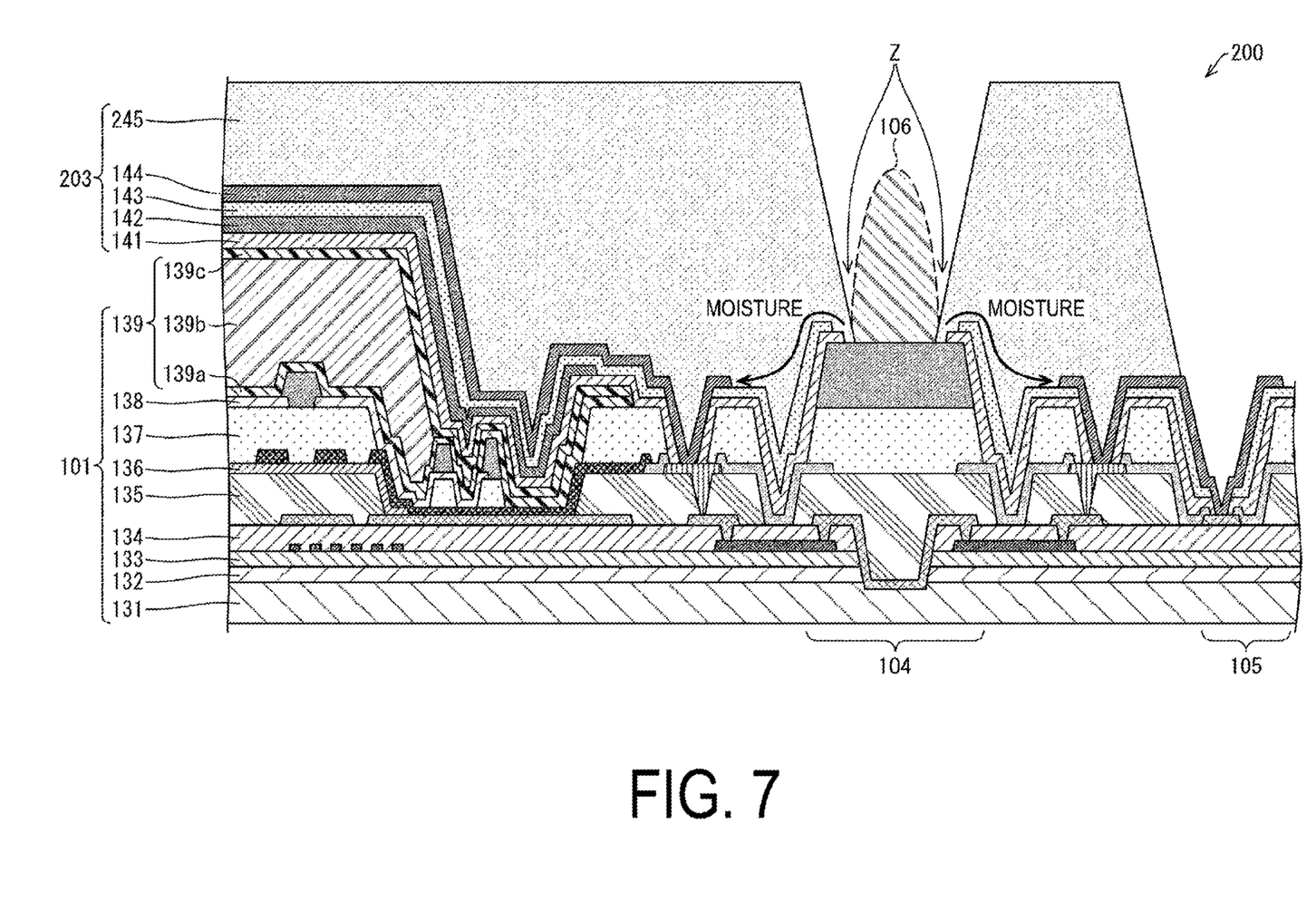
FIG. 7 is a cross-sectional view illustrating a comparative example corresponding to the cross-sectional view of FIG. 4.

FIG. 6 is a cross-sectional view of a display device 200 of the comparative example corresponding to the display device 100 illustrated in the cross-sectional view of FIG. 3. FIG. 7 is a cross-sectional view of the display device 200 of the comparative example corresponding to the display device 100 illustrated in the cross-sectional view of FIG. 4.

The display device 200 has substantially the same configuration as the display device 100 illustrated in FIG. 3, except the structure of a touch panel 203 as illustrated in FIG. 6. The touch panel 203 adopts an organic film as an overcoat layer 245 covering the second metal electrode 144 on the topcoat layer 143 made of an inorganic film. Moreover, in a touch region 203a of the touch panel 203, the topcoat layer 143 made of an inorganic film and the overcoat layer 245 made of an organic film are formed in a part corresponding to the light-emitting element layer 111 of the display panel 101, and therefore the light from the display panel 101 is lost by about 3% as compared with a case without those inorganic film and organic film.

As illustrated in FIG. 7, the overcoat layer 245 made of an organic film is formed up to the sealing resin 106 formed on the bent region 104 of the display panel 101. Therefore, atmospheric components, that is, moisture may enter from a boundary portion Z with the overcoat layer 245 in the vicinity of the sealing resin 106 on the bent region 104, and corrode the second metal electrode 144, which is a touch panel wiring line in the uppermost layer.

These problems are solved in the display device 100 of the present embodiment. Specifically, as illustrated in FIG. 3, in the touch region 103a of the touch panel 103, the opening 103b larger than the transmissive region (light-emitting region) 101a of the display panel 101 is formed, and therefore the influence on the transmittance of the light from the light-emitting element layer 111 can be substantially eliminated. In the touch panel 103, as illustrated in FIG. 4, the overcoat layer 145 made of an inorganic film is formed up to the sealing resin 106 formed on the bent region 104 of the display panel 101. That is, the second metal electrode 144, which is a touch panel wiring line in the uppermost layer, is covered with the overcoat layer 145. This prevents entry of atmospheric components (moisture and the like) into the touch panel wiring line in the uppermost layer from the vicinity of the sealing resin 106 in the bent region 104, and as a result, this avoids corrosion of the second metal electrode 144, which is a touch panel wiring line. Therefore, reliability of the wiring line of the touch panel can be improved.

Second Embodiment

Another embodiment of the disclosure will be described below. In the present embodiment, members having the same functions as the members in the first embodiment are denoted by the same reference signs, and detailed description thereof is omitted.

Display Device 300

Figure 8:
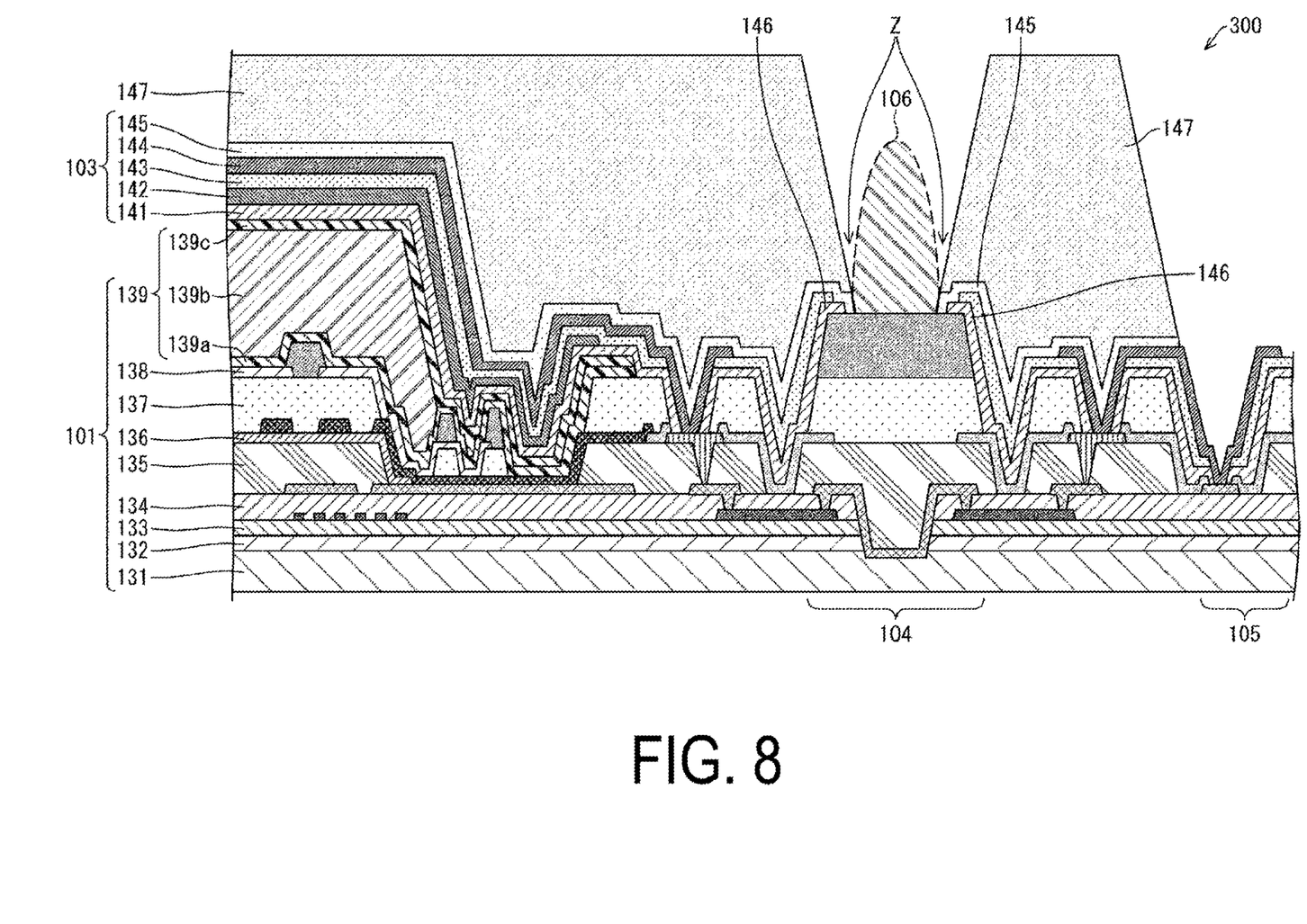
FIG. 8 is a cross-sectional view illustrating a vicinity of a bent region of a display device according to another embodiment of the disclosure.

FIG. 8 corresponds to FIG. 4 of the embodiment 1 described above, and illustrates a cross-sectional view of the vicinity of the bent region 104 and the terminal electrode 105 of a display device 300 according to the present embodiment.

The display device 300 has substantially the same configuration as the display device 100 of the first embodiment described above, but is different in that an organic protection film (organic insulating layer) 147 is formed in an upper layer overlying the overcoat layer 145 made of an inorganic film on the outermost surface of the touch panel 103.

Manufacturing Method for Display Device 300

Figure 9:
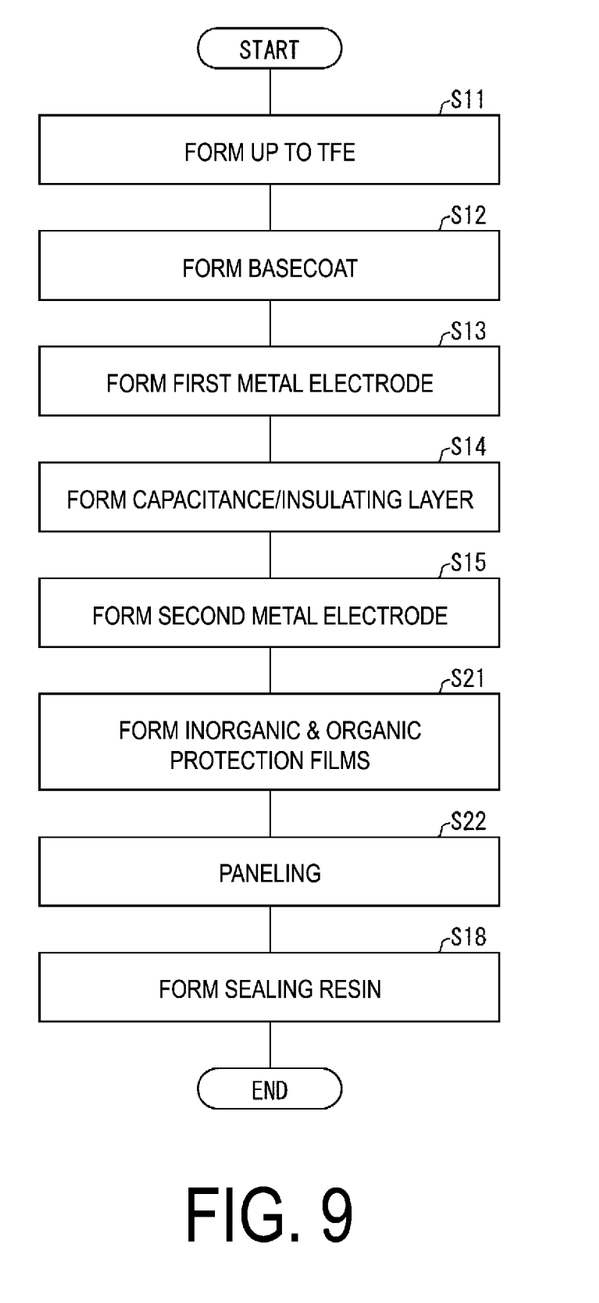
FIG. 9 is a view illustrating a manufacturing process of the display device illustrated in FIG. 8.

FIG. 9 is a view illustrating each process of a manufacturing method for the display device 300. The manufacturing process of the display device 300 is substantially the same as the manufacturing process of the display device 100 of the first embodiment, and is different in the process of forming an inorganic protection film so as to cover the second metal electrode 144 in step S16 of FIG. 5. Specifically, in FIG. 9, steps S21 and S22 are executed in place of steps S16 and S17 of FIG. 5. In step S21, an inorganic protection film and an organic protection film are formed. Specifically, an inorganic protection film as the overcoat layer 145 covering the second metal electrode 144 is formed in an upper layer overlying the topcoat layer 143, and then the organic protection film 147 is formed in an upper layer overlying the inorganic protection film. The overcoat layer 145 and the organic protection film 147 are formed by, for example, application of an organic material and processing by photolithography.

Specifically, the topcoat layer 143 and the overcoat layer 145 are formed at desired positions with respect to the touch panel 103. Thereafter, after the organic protection film 147 is formed by photolithography, the topcoat layer 143 and the overcoat layer 145, which are inorganic films, and the organic protection film 147 are removed by dry etching or the like.

Thereafter, in step S22, paneling is performed. Here, in the manufacturing process so far, the flexible insulating substrate (substrate: flexible substrate) 131 processed on a carrier glass is peeled off from the carrier glass by laser lift-off, thereby performing paneling. At this time, in a case where a plurality of panels such as a small panel for a smartphone is manufactured on the carrier glass, the panels are individually divided.

Advantageous Effects

In the display device 300 having the above configuration, similarly to the first embodiment, the first metal electrode 142 and the second metal electrode 144 of the touch panel 103 are protected by an inorganic film (the topcoat layer 143 and the overcoat layer 145). Therefore, even if the organic protection film 147 is formed on the outermost surface, the inorganic film can prevent atmospheric components (moisture and the like) from entering the first metal electrode 142 and the second metal electrode 144. Therefore, since the first metal electrode 142, the second metal electrode 144, and the third metal electrode 146, which are touch panel wiring lines of the touch panel 103, are not corroded, improvement of reliability of the wiring lines of the touch panel 103 is expected.

Moreover, since the organic protection film 147 is formed on the outermost surface of the touch panel 103, irregularities on the surface are leveled.

In the present embodiment, an example of removing the organic protection film 147 of the part corresponding to the opening 103b of the touch region 103a of the organic protection film 147 formed on the outermost surface of the touch panel 103 has been described, but the organic protection film 147 needs not be removed. In this case, although the transmittance slightly decreases due to the organic protection film 147, the vicinity of the touch region 103a can also be leveled, and therefore the surface of the touch panel 103 can be leveled.

Supplement

A display device according to a first aspect of the disclosure includes: a substrate on which a plurality of wiring lines are formed; an interlayer insulating layer configured to cover the plurality of wiring lines on the substrate; a light-emitting element on the interlayer insulating layer; a sealing layer configured to cover the light-emitting element; a first inorganic insulating layer configured to cover the sealing layer; a first detection electrode extending in a first direction on the first inorganic insulating layer; a second inorganic insulating layer configured to cover the first detection electrode and the first inorganic insulating layer; a second detection electrode extending in a direction intersecting the first direction on the second inorganic insulating layer; and a third inorganic insulating layer configured to cover the second detection electrode and the second inorganic insulating layer, in which the first inorganic insulating layer, the second inorganic insulating layer, and the third inorganic insulating layer are provided with an opening in a region corresponding to a light-emitting region where the light-emitting element emits light.

According to the above configuration, since the light-emitting region where the light-emitting element emits light is not covered with the inorganic insulating layer and is opened, there is almost no loss in transmittance. Moreover, since the first detection electrode and the second detection electrode are covered with the third inorganic insulating layer on the outermost surface, the first detection electrode and the second detection electrode are hardly affected by the atmosphere, that is, moisture. Therefore, the first detection electrode and the second detection electrode are less likely to corrode, and therefore the reliability of the first detection electrode and the second detection electrode can be improved.

In a display device according to a second aspect of the disclosure, in the first aspect, it is preferable that the opening overlaps the light-emitting region in plan view and is larger than the light-emitting region.

According to the above configuration, loss of transmittance of the light from the light-emitting region can be reliably eliminated.

It is preferable that a display device according to a third aspect of the disclosure further includes, in the first or second aspect, a first connection wiring line to be electrically connected to the first detection electrode, and a second connection wiring line to be electrically connected to the second detection electrode, in which a plurality of terminal electrodes are formed along an end portion of the substrate, and each of the first connection wiring line and the second connection wiring line is connected to a corresponding terminal electrode of the plurality of terminal electrodes.

According to the above configuration, the length from the first detection electrode to the terminal electrode can be adjusted by the length of the first connection wiring line. Similarly, the length from the second detection electrode to the terminal electrode can also be adjusted by the length of the second connection wiring line.

In a display device according to a fourth aspect of the disclosure, in the third aspect, it is preferable that the substrate is a flexible substrate that is bendable on the terminal electrode formation side, and the third inorganic insulating layer includes a bendable portion of the substrate, and is formed to a position right in front of a terminal electrode of the substrate.

According to the above configuration, since the electrode at the bendable portion of the substrate is also covered with the third inorganic insulating layer, the electrode is not corroded even if atmospheric components (moisture and the like) enter from the bendable portion.

In a display device according to a fifth aspect of the disclosure, in any one aspect of the first to fourth aspects, it is preferable that an organic insulating layer is formed in an upper layer overlying the third inorganic insulating layer.

According to the above configuration, since the organic insulating layer is formed in the upper layer overlying the third inorganic insulating layer, irregularities on the touch panel surface side of the display device can be eliminated and leveled.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in each of the embodiments.

The invention claimed is:

1. A display device comprising:
a substrate on which a plurality of wiring lines is formed;
an interlayer insulating layer configured to cover the plurality of wiring lines on the substrate;
a light-emitting element formed on the interlayer insulating layer and including an anode and a cathode;
a sealing layer configured to cover the light-emitting element;
a first inorganic insulating layer configured to cover the sealing layer;
a first detection electrode formed on the first inorganic insulating layer and extending in a first direction;
a second inorganic insulating layer configured to cover the first detection electrode and the first inorganic insulating layer;
a second detection electrode formed on the second inorganic insulating layer and extending in a second direction intersecting the first direction; and
a third inorganic insulating layer configured to cover the second detection electrode and the second inorganic insulating layer,
wherein the first inorganic insulating layer, the second inorganic insulating layer, and the third inorganic insulating layer have an opening overlapping a part of the anode and a part of the cathode in a plan view.

2. The display device according to claim 1,
Wherein the light-emitting element further includes a light-emitting region where the light-emitting element emits light, and
the opening overlaps the light-emitting region in the plan view and is larger than the light-emitting region.

3. The display device according to claim 1, further comprising:
a first connection wiring line configured to be electrically connected to the first detection electrode; and
a second connection wiring line configured to be electrically connected to the second detection electrode,
wherein a plurality of terminal electrodes is formed along an end portion of the substrate, and
each of the first connection wiring line and the second connection wiring line is connected to a corresponding terminal electrode of the plurality of terminal electrodes.

4. The display device according to claim 3,
wherein the substrate is a flexible substrate that is bendable on a terminal electrode formation side, and
the third inorganic insulating layer includes a bendable portion of the substrate, and is formed up to a position right in front of a terminal electrode of the substrate.

5. The display device according to claim 1,
wherein an organic insulating layer is formed in an upper layer overlying the third inorganic insulating layer.

6. The display device according to claim 1,
wherein the sealing layer includes a first inorganic sealing film directly covering the light-emitting element, an organic film covering the first inorganic sealing film, and a second inorganic sealing film covering the organic film, and
the first inorganic insulating layer is formed on the second inorganic sealing film.

\* \* \* \* \*